Patented Mar. 7, 1933

1,899,961

UNITED STATES PATENT OFFICE

CLYDE O. HENKE, OF SOUTH MILWAUKEE, WISCONSIN, ASSIGNOR, BY MESNE ASSIGNMENTS, TO NEWPORT INDUSTRIES, INC., A CORPORATION OF DELAWARE

HYDROGENATED ROSIN PRODUCT

No Drawing.    Application filed October 6, 1930. Serial No. 486,748.

This invention relates to a process for preparing improved resins of low color content from hydrogenated abietic acid containing material and to the products so formed.

The process of hydrogenating rosin to convert the same into resinous products having substantially the same commercial uses as ordinary rosin but possessing somewhat greater value in use has been known for some time, as evidenced by the U. S. patent to Brooks No. 1,167,264. These products, however, do not differ materially in color content from the rosin material which is hydrogenated and, accordingly, they are limited in their commercial applicability to about the same field of utility as the original rosin material.

I have now found that if abietic acid containing material is hydrogenated according to the method of the above patent or similar known hydrogenating methods and the resulting resin then distilled under a high vacuum, a resinous product is obtained which has a remarkably small color content as compared with the orginal abietic acid containing material. In certain cases, if a refined grade of rosin, for instance, grade N or higher is used as a starting material, the resinous end products are substantially devoid of all color and in this respect are very far superior to any rosin on the ordinary rosin grading scale. As a matter of fact, the end products in such cases are comparable in clearness and colorlessness with the finest gum dammars and water white copals. For this reason, said end products are adapted, particularly after esterification, for many of the purposes for which these costly gums are usually employed.

The resinous products of this invention are moreover particularly suited for the uses to which ordinary rosin is put, such as the preparation of varnishes, soaps, paper sizes and the like, and in each case generally yield results surpassing those obtained by using the ordinary commercial grades of rosin.

These products are furthermore characterized by an exceptionally high dextro-rotation of the plane of polarized light, in some cases producing a rotation as high as +60 to +70°, or even higher.

The fact that the hydrogenated abietic acid containing material could be vacuum distilled was not obvious, for although it is common to refine ordinary wood or gum rosin by distillation, it is well known that a great many resins or rosin derivatives, such as gum dammar, copals, ester gum and the like, cannot be vacuum distilled without decomposition. Still less was it to be foreseen that the vacuum distillation would so effectively separate the colorless constituents from the colored impurities of the original abietic acid containing material so as to produce a substantially colorless end product. Distillation of ordinary wood rosin improves its color it is true, but to an extent that is practically negligible when compared with the results attendant upon the use of my process. A concrete idea of this property of some of my products may be obtained from the fact that a prism of the same 5 inches long, derived from a refined grade of rosin as grade N, shows far less color than the standard ⅞ inch cube of ordinary rosin of grade X (the finest grade on the rosin grading scale).

It is accordingly an object of this invention to provide a process for treating abietic acid containing material to obtain therefrom resinous products having a materially smaller color content than the original abietic acid containing material.

It is a further important object of this invention to provide a process for treating hydrogenated rosin material to produce a resinous product substantially devoid of all color content.

It is a still further object of this invention to provide an efficient, economical process for obtaining a substantially color free resin from a commercial grade of rosin material.

It is another object of this invention to provide a substantially color free resin having greater utility than ordinary rosin in the field of commercial applicability of the latter.

It is a further important object of this invention to provide a water-white hydrogenated resin which is adapted as a substitute for expensive natural resins in those arts requiring a fine, color-free resin.

Other and further important objects of this invention will become apparent from the following description and appended claims.

The essential steps of my process comprise hydrogenating an abietic acid containing material while in fluid condition, in the presence of a suitable catalyst. The reaction mass after hydrogenation is complete, is filtered to remove the catalyst. The filtrate is next distilled under a high vacuum and, if desired, with the aid of superheated steam. The first fraction of the distillate or the forerun, which amounts to about 10% of the weight of the material being distilled constitutes an oily by-product which is collected separate from the remaining distillate. The main part of the distillate amounting to 70 to 75% of the initial material in the still is then collected. This fraction constitutes my improved resinous end product above referred to. The residue remaining in the still is a dark pitchy by-product containing apparently all the impurities and coloring matters of the initial hydrogenated material.

It is necessary for best results to free the hydrogenated product from the catalyst as completely as possible before distillation as otherwise the catalyst during the distillation step causes decomposition of a part of the hydrogenated material, thereby contaminating the distilled product.

A simple way for effecting removal of the catalyst is by filtration of the hydrogenated mass. The elimination of the catalyst by this method is rendered more nearly complete by incorporating in the original abietic acid containing material, a fibrous material, such as, asbestos, filtercel or pumice which tends to collect the catalyst and hold it mechanically in its pores. It will be understood, of course, that the catalyst is in a highly divided physical state in accordance with the general procedure in hydrogenating processes.

I have also found that, although, the hydrogenated abietic acid containing mass can be successfully filtered while either in the molten state or in solution in a suitable solvent, the product obtained by distillation of the filtered mass in the former case is considerably superior to that obtained by a similar procedure in the latter case. For best results, therefore, the former procedure is to be preferred.

The following examples, in which parts by weight are given, serve to more fully illustrate the nature of my invention.

Example 1

100 parts of wood rosin (grade N) are charged into a nickel-plated steel autoclave, together with 2 parts of a finely divided nickel catalyst and 0.25 parts of acid washed asbestos fiber. Hydrogen under pressure is then introduced and the entire charge heated to about 225 to 250° C. As the reaction sets in, the pressure in the autoclave drops due to the absorption of hydrogen by the rosin. Additional hydrogen is then introduced to restore the pressure to about 400 to 500 pounds per square inch. The above temperature and this pressure are maintained throughout the reaction period, the course of the reaction being followed by means of a pressure gauge. When no further drop in pressure occurs, indicating that no more hydrogen is being absorbed, the pressure is released and the entire reaction mass filtered hot. In laboratory-size apparatus, this hydrogenation step usually requires about 3 to 6 hours.

The filtrate is now placed in a still and heated under a high vacuum until distillation begins. A vacuum of about 2 mm. of mercury may be employed. However, somewhat higher pressures may be used, as long as the temperature necessary under such conditions does not rise so high as to cause appreciable decomposition. This upper limit of temperature may be roughly placed at about 275 to 300° C. Preferably, however, it should not be allowed to go higher than about 250 to 260° C.

The first 10 parts of the distillate are collected separately and constitute a semi-fluid material of low acid value. The second fraction which constitutes the end product of this invention is collected until its weight corresponds to approximately 72 to 73 parts of the original hydrogenated mass. This cut solidifies upon cooling into a transparent and substantially colorless mass, having an acid value of about 165, an iodine value of about 35 to 40 (by the Hubl method) and a dextro-rotation in petroleum naphtha of about +60°.

For best results, a still should be selected of a material such as nickel, copper, or Monel metal which does not tend to cause decomposition of the material at the distillation temperature. Enameled iron or glass-ware may also be used.

Distillation of the molten mass may be facilitated by sweeping inert vapors, for instance, superheated steam, through the same. The vacuum employed should preferably be maintained as high as possible, say 2 to 4 mm., and for best results the pressure should not be allowed to rise above 10 mm. absolute. Where, however, steam is used to aid in the distillation, somewhat higher pressures, for instance, 25 mm. absolute may be employed.

Example 2

100 parts of wood rosin (grade N) are charged into an autoclave, together with 0.5 parts of nickel carbonate, 0.5 parts of copper carbonate, and 0.25 parts of asbestos fiber. Hydrogen is now introduced, and the entire mass heated as before for a period of about 6 hours at a temperature of about 235° C. and under a pressure of about 400 to 500 pounds per square inch. The pressure is then released and the hydrogenation mass filtered hot, and distilled under a high vacuum as in Example 1. The main cut of the distillate yields about 74.5 parts of a transparent and substantially colorless resin having an iodine value of about 20.8 and a dextro-rotation in petroleum naphtha of about +64.6°.

*Example 3*

The procedure in this example is substantially the same as in Example 2, except that the quantity of catalyst is doubled; that is, 1 part of nickel carbonate, 1 part of copper carbonate, and 0.25 parts of asbestos fiber are used to every 100 parts of rosin. The main cut of the distillate is substantially similar to the product obtained in Examples 1 and 2, except that the iodine value is 12.5 and the dextro-rotation is +55.4°.

While the above examples disclose the application of my process to wood rosin it is to be understood that it may be also applied to gum rosin with equally good results. It may furthermore be applied to pure abietic acid, or to any other abietic acid containing material. Moreover, low grade rosins as well as high grade rosins may be treated by my process. The product derived from grades of rosin darker than N are not, however, so free from color as those derived from N or the lighter grades. Thus, in the case of FF rosin, the distillation product has a distinctly yellow color, although much paler than that obtained by distilling the unhydrogenated rosin.

It should be noted that, although the use of asbestos is recommended, it is not necessary to deposit the catalyst on the asbestos prior to use, as is customary in other hydrogenation processes. In fact, the asbestos may even be added after hydrogenation and just prior to filtration.

The quality of the final product can be varied somewhat by increasing or diminishing the amount of the first fraction of distillate or the forerun. This cut is characterized by a low acid value as compared to the bulk of the distillate for the acid value of the distillate rises as distillation proceeds. The exact point at which to begin collection of the main body of distillate is rather arbitrary and will vary in different cases. Care should, however, be taken to prevent too much of the low acid value forerun from being collected with the main product as it renders said product somewhat tacky and decreases the quality of the same.

The end of the distillation is marked by a rise in pressure in the still due to the decomposition of the residue remaining therein. Preferably the distillation is stopped shortly before this point is reached.

As stated above, the hydrogenation is preferably continued until the pressure becomes constant, indicating that no further amount of hydrogen is being absorbed. However, this point may also be determined by testing samples of the product for its iodine value. Hydrogenation should be continued until this value falls below 60 and preferably below 40.

While I have disclosed various embodiments of my invention, it is to be understood that I do not intend to be limited in the patent granted thereon except as necessitated by the prior art and appended claims.

I claim as my invention:

1. The process of preparing improved resinous products of low color content from abietic acid containing material which comprises hydrogenating the abietic acid containing material in the presence of a catalyst, separating the catalyst from the hydrogenated product, vacuum distilling the hydrogenated product and isolating an intermediate fraction of the distillate.

2. The process of preparing substantially colorless resinous products from abietic acid containing material which comprises hydrogenating abietic acid containing material in the presence of a hydrogenating catalyst, separating the catalyst from the hydrogenated product, vacuum distilling the hydrogenated product until a hard, pitchy residue remains and recovering that fraction of the distillate intermediate said hard, pitchy residue and an oily forerun.

3. A process for preparing a substantially colorless resin which comprises treating one of the paler grades of rosin in the molten state with hydrogen in the presence of a finely divided hydrogenation catalyst, filtering the reaction mass to remove the catalyst, subjecting the filtrate to distillation under a high vacuum until a hard, pitchy residue remains, and recovering the fraction intermediate said hard, pitchy residue and an oily forerun.

4. The process of preparing a substantially colorless resin which comprises treating molten rosin of a pale grade at an elevated temperature and pressure with hydrogen in the presence of a nickel catalyst and asbestos fibers until its iodine value drops to below 40, filtering the reaction mass hot to remove the nickel catalyst and said asbestos fibers, subjecting the filtrate to distillation under a high vacuum, removing a forerun amounting to about 10% of said filtrate and recovering the subsequent fraction to an amount of about 70 to 75% of said filtrate.

5. The process of preparing a substantially colorless resin which comprises treating molten rosin of a pale grade at an elevated temperature and pressure with hydrogen in the presence of a nickel catalyst and asbestos fibers until its iodine value drops to below 40, filtering the reaction mass hot, subjecting the filtrate to distillation under a high vacuum at a temperature of between 225 to 275°

C., removing a forerun amounting to about 10% of said filtrate and recovering the subsequent fraction to an amount of about 70 to 75%.

6. In the process of preparing a substantially colorless resinous product by hydrogenating rosin in the presence of a catalyst, the step which comprises vacuum distilling the hydrogenated product in the absence of any appreciable quantity of said catalyst and recovering an intermediate fraction of the distillate.

7. In the process of producing a substantially colorless resin, the step which comprises vacuum distilling hydrogenated abietic acid containing material, removing a forerun amounting to about 10% of said material and recovering a subsequent fraction amounting to about 70 to 75% of said material.

8. In the process of producing a substantially colorless resin, the step which comprises distilling hydrogenated abietic acid containing material under a vacuum at a temperature of about 250 to 300° C. and recovering an intermediate fraction of the distillate.

9. In the process of producing a substantially colorless resin, the step which comprises distilling hydrogenated abietic acid containing material under a high vacuum at a temperature of about 260° C., removing a forerun amounting to about 10% of said material and recovering a subsequent fraction amounting to about 70 to 75% of said material.

10. As a new product of manufacture a hydrogenated rosin derivative having substantially no color content, an iodine number of less than 60 but greater than 20 and a positive optical rotation of above 50°.

In testimony whereof I have hereunto subscribed my name at Carrollville, Milwaukee County, Wisconsin.

CLYDE O. HENKE.